United States Patent
Fournand et al.

(10) Patent No.: US 9,726,787 B2
(45) Date of Patent: *Aug. 8, 2017

(54) METHOD FOR THE PRODUCTION OF AN OPTICAL ARTICLE WITH IMPROVED ANTI-FOULING PROPERTIES

(71) Applicant: ESSILOR INTERNATIONAL (COMPAGNIE GENERALE D'OPTIQUE), Charenton-le-Pont (FR)

(72) Inventors: Gerald Fournand, Dallas, TX (US); Agnes Jallouli, Dudley, MA (US); Dominique Conte, Charenton-le-Pont (FR)

(73) Assignee: ESSILOR INTERNATIONAL (COMPAGNIE GENERALE D'OPTIQUE, Charenton-le-Pont (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/758,124

(22) PCT Filed: Dec. 26, 2013

(86) PCT No.: PCT/EP2013/078016
§ 371 (c)(1),
(2) Date: Jun. 26, 2015

(87) PCT Pub. No.: WO2014/102298
PCT Pub. Date: Jul. 3, 2014

(65) Prior Publication Data
US 2015/0331152 A1    Nov. 19, 2015

Related U.S. Application Data

(60) Provisional application No. 61/746,816, filed on Dec. 28, 2012.

(51) Int. Cl.
 G02B 1/00 (2006.01)
 G02B 1/18 (2015.01)
 G02B 27/00 (2006.01)
(52) U.S. Cl.
 CPC ........... *G02B 1/18* (2015.01); *G02B 27/0006* (2013.01); *Y10T 428/31663* (2015.04)
(58) Field of Classification Search
 None
 See application file for complete search history.

(56) References Cited

U.S. PATENT DOCUMENTS

| 6,183,872 | B1 * | 2/2001 | Tanaka | C08G 65/007 106/287.13 |
|---|---|---|---|---|
| 7,449,233 | B2 | 11/2008 | Arora | |
| 7,838,068 | B2 * | 11/2010 | Lacan | C03C 17/00 427/154 |
| 2005/0115923 | A1 * | 6/2005 | Lacan | C03C 17/3417 216/26 |
| 2006/0246278 | A1 * | 11/2006 | Lacan | B24B 9/144 428/336 |
| 2007/0141358 | A1 * | 6/2007 | Jallouli | B24B 9/146 428/426 |
| 2007/0172622 | A1 | 7/2007 | Goetz et al. | |
| 2007/0183056 | A1 | 8/2007 | Conte et al. | |
| 2009/0011255 | A1 | 1/2009 | Komai et al. | |
| 2009/0232978 | A1 | 9/2009 | Suzuki et al. | |
| 2010/0053547 | A1 | 3/2010 | Baude et al. | |
| 2010/0279089 | A1 * | 11/2010 | Naito | C09D 175/06 428/212 |

FOREIGN PATENT DOCUMENTS

JP    2008073883    4/2008

OTHER PUBLICATIONS

English language machine translation of JP-200807883, 13 pages, translation generated Aug. 2016.*

* cited by examiner

*Primary Examiner* — Robert S Loewe
(74) *Attorney, Agent, or Firm* — Norton Rose Fulbright US LLP

(57) ABSTRACT

The present invention is dedicated to a method for the manufacture of an optical article comprising the following steps: providing a substrate having two main faces and bearing —OH functions on at least one of its faces, successively exposing one face of the substrate bearing —OH functions to at least 2 distinct materials named M1 and M2, M1 having a weight average molecular weight higher than M2, in a vacuum chamber under conditions resulting in the deposit of those materials on the surface of the substrate, and wherein: M1 is a substituted silane comprising: at least one function X1 bonded to a silicon atom, wherein the Si—X1 group is capable of forming a covalent bond with a —OH group of the substrate and/or a covalent bond with M2, and at least one fluorine containing group, M2 is a substituted silane having a number average molecular weight inferior or equal to 900 g/mol, comprising: at least one function X2 bonded to a silicon atom, wherein the Si—X2 group is capable of forming a covalent bond with a —OH group of the substrate and/or a covalent bond with M1, and at least one hydrophobic and/or oleophobic group, or at least one hydrophilic group, wherein the difference between the weight average molecular weight of M1 and the weight average molecular weight of M2 is higher than or equal to 600 g/mol.

23 Claims, No Drawings

METHOD FOR THE PRODUCTION OF AN OPTICAL ARTICLE WITH IMPROVED ANTI-FOULING PROPERTIES

CROSS-REFERENCE TO RELATED APPLICATIONS

This application is a national phase application under 35 U.S.C. §371 of International Application No. PCT/EP2013/078016 filed 26 Dec. 2013, which claims priority to U.S. Provisional Application No. 61/746,816 filed 28 Dec. 2012. The entire contents of each of the above-referenced disclosures is specifically incorporated by reference herein without disclaimer.

FIELD OF THE INVENTION

The invention is directed to a method for the manufacture of an optical article, such as ophthalmic lenses, with improved anti-smudge or anti-fouling properties and improved durability of these anti-smudge and anti-fouling properties. It is also directed to optical articles, especially lenses, obtained by this method.

The invention is concerned more particularly with the production of optical articles comprising, as an outermost layer, an anti-fouling topcoat such as a hydrophobic and/or oleophobic surface coating.

An ophthalmic lens results from a succession of molding and/or surfacing/smoothing operations determining the geometry of both convex and concave optical surfaces of said lens, followed by appropriate surface treatments and finally by edging.

The method of the invention comprises providing a substrate having two main faces and successively exposing at least one face of the substrate to at least two distinct materials in a chamber under conditions possibly resulting in the deposition of a layer of those materials on the surface of the substrate, the first of those materials being selected from substituted silanes (M1) of preferably high molecular weight comprising at least one function bonded to the silicon atom capable of forming a covalent bond with a substrate bearing —OH groups and/or forming a covalent bond with a substituted silane M2 and comprising at least one fluorine containing group, the second of those materials being selected from substituted silanes (M2) of preferably low molecular weight comprising at least one function bonded to the silicon atom capable of forming a covalent bond with a substrate bearing —OH groups and/or a covalent bond with M1 and comprising at least one hydrophobic and/or oleophobic group or hydrophilic group.

DESCRIPTION OF RELATED ART

It is a common practice in the art to coat at least one main surface of a lens substrate, such as an ophthalmic lens or lens blank, with several coatings which impart to the finished lens additional or improved optical or mechanical properties. These coatings are usually designated as functional coatings.

Thus, it is a usual practice to coat at least one main surface of a lens substrate, typically made of an organic glass material, with successively, starting from the surface of the lens substrate, an impact-resistant coating (impact resistant primer), an abrasion- and/or scratch-resistant coating (hard coat) and an anti-reflection coating.

The last generation ophthalmic lenses most often also comprise an external layer of anti-fouling material generally deposited on the anti-reflection coating, in particular an anti-reflection coating made of an inorganic material, so as to reduce their strong tendency to staining, for example towards fatty deposits. Such an anti-fouling topcoat is generally a hydrophobic and/or oleophobic coating, which reduces the surface energy of the lens so as to avoid the adhesion of fatty stains, which are thus easier to remove. The hydrophobic topcoat constitutes, in the finished optical article, the outermost coating.

Such topcoats are well known in the art and are usually made of fluorosilanes or fluorosilazanes i.e., silicones or silazanes bearing fluorine-containing groups. Examples of classical materials for topcoats are OPTOOL DSX™, which is a fluorine-based resin comprising perfluoropropylene moieties, commercialized by Daikin Industries, KY130™ from Shin-Etsu Chemical and KP 801M™, also commercialized by Shin-Etsu Chemical, and AES4™ commercialized by Daikin Industries. These coatings impart to the lens a static contact angle with water of at least 100°.

They can be used in mixtures. For example US patent application US2009/0011255 discloses the deposition of a stain proofing layer deposited on an organic AR coating, the stain proofing layer being formed from a composition including one type of fluorosilane compound having a molecular weight in the range of from 1000 to 10000 and at least one type of fluorosilane compound having a molecular weight in the range of from 100 to 700. The resulting stain proofing layer in order to improve durability.

In the process of US2009/0011255, the two silanes are applied concomitantly by applying a liquid mixture of those silanes by dip coating or by evaporating them at the same time in a vacuum chamber.

It is a constant preoccupation to improve the hydrophobicity and/or oleophobicity of the lens topcoat layer.

A known solution might consist in increasing the thickness of the topcoat layer. However, this solution is extremely costly, the topcoat materials being high molecular weight sophisticated molecules.

The superposition of distinct fluorine containing silane materials is known from the prior art.

Document WO2007/071700 discloses a method for improving the edging of an article by providing a temporary layer of an organic material. A layer of a topcoat including a silane with at least one fluorine containing group is deposited and then a temporary layer of a fluorinated compound of low molecular weight is deposited.

Document US2007/0172622 discloses an ophthalmic glass with a special layer structure comprising a layer of a silane with at least one fluorine containing group with more than 20 carbon atoms and a transparent removable protective layer applied thereon which comprises a silane with at least one fluorine containing group with 20 carbon atoms or less. The second layer provides an adjustment of the surface energy of the glass, in a temporary manner to a value lower than 15 mJ/m².

Document U.S. Pat. No. 7,449,233 discloses substrates with a first hydrophobic layer having a first contact angle and a second hydrophobic layer having a second contact angle, the first hydrophobic layer being between the second hydrophobic layer and the substrate, the first contact angle being greater than the second contact angle. The first hydrophobic layer is based on a perfluoropolyether silicon compound. The second hydrophobic layer can be based on a perfluoropolyether silicon compound. The second hydrophobic layer is temporary and can be easily removed after handling of the coated substrate is finished, or at least some processing of the coated substrate is finished, using water or alcohol or simply wiping the substrate off, after which the bonded or first hydrophobic layer remains bonded on the substrate. This second hydrophobic layer increases the surface energy of the substrate on which it is deposited, so that the substrate can be handled and submitted to machining. The method of the invention differs from those described in these three documents in that the second silane deposit modifies, in a permanent manner, the properties of the optical article including the first silane deposit. The articles resulting from the application of this method are therefore new as compared to those of the prior art. In comparison, the methods of the prior art are performed in such conditions (choice of non-grafting molecules, presence of an intermediate layer or selection of process parameters) that the second silane layer can be removed at the end of the process, for instance by simply wiping the surface with a cloth. And in a surprising manner, although the materials employed in the second silane deposit are less hydrophobic than those of the first silane deposit or even hydrophilic, it has been observed that the second silane deposited by following the method of the invention contributes to the reduction of the surface energy, to the improvement of the oleophobicity of the coated substrate and to the durability of hydrophobicity and oleophobicity of the coating.

SUMMARY OF THE INVENTION

The terms "comprise" (and any form of comprise, such as "comprises" and "comprising"), "have" (and any form of have, such as "has" and "having"), "contain" (and any form of contain, such as "contains" and "containing"), and "include" (and any form of include, such as "includes" and "including") are open-ended linking verbs. As a result, a method, or a step in a method, that "comprises," "has," "contains," or "includes" one or more steps or elements possesses those one or more steps or elements, but is not limited to possessing only those one or more steps or elements. In preferred embodiments, the method or step is limited to possessing only those one or more steps.

The optical articles used in the process of the invention are preferably ophthalmic lens substrates. The term "substrate" means an organic or inorganic glass substrate, either treated or not, depending upon whether it comprises one or more coatings of various natures or whether it is naked. Herein, the term "lens" means the product resulting from the application of successive treatments: coating or deposit, edging etc. . . . .

It has been an aim of the invention to provide a method for producing an optical article with improved properties.

Specifically, it has been an aim of the invention to provide a method for producing an optical article including a hydrophobic and/or oleophobic topcoat, and to obtain satisfying superior hydrophobicity and/or oleophobicity as compared to the prior art topcoated articles, without significantly increasing the price of this article.

Additionally, it has been an aim of the invention to provide a method for producing an optical article with improved anti-fouling and anti-smudge properties at an acceptable cost.

Such aims have been reached thanks to the method that will be disclosed here-under.

A first object of the invention is a method for the manufacture of an optical article comprising the following steps:
  providing a substrate having two main faces and bearing —OH functions on at least one of its faces,
  successively exposing one face of the substrate bearing —OH functions to at least two distinct materials named M1 and M2, M1 having a weight average molecular weight higher than M2, preferably in the order M1 followed by M2, in a vacuum chamber under conditions resulting in the deposit of those materials on the surface of the substrate, and wherein:
  M1 is a substituted silane comprising:
    at least one function X1 bonded to a silicon atom, wherein the Si—X1 group is capable of forming a covalent bond with a —OH group of the substrate and/or a covalent bond with M2 (preferably a silicon atom of M2), and
    at least one fluorine containing group,
  M2 is a substituted silane having a weight average molecular weight inferior or equal to 900 g/mol, comprising:
    at least one function X2 bonded to a silicon atom, wherein the Si—X2 group is capable of forming a covalent bond with a —OH group of the substrate and/or a covalent bond with M1 (preferably a silicon atom of M1), and
    at least one hydrophobic and/or oleophobic group, or at least one hydrophilic group,
  wherein the difference between M1 and M2 weight average molecular weights is equal to or higher than 600 g/mol, preferably equal to or higher than 900 g/mol.

According to the invention, the method of manufacture of the optical device comprises the successive application of at least two surface coatings, the term "the deposit of those materials on the surface of the substrate" means that each material is deposited onto the outermost coating of the substrate which is resulting from the prior deposit step.

The method steps are preferably performed in the order M1 deposit, then M2 deposit.

By substrate is meant, in the context of the invention, a material comprising two main faces apt to be submitted to the deposit of materials under reduced pressure. Substrates include materials with porous and non-porous surfaces. It includes materials such as glasses, ceramics, porcelains, fiberglass, metals, and organic materials including thermosets such as polymer of diethylene glycol bis allyl carbonate, and thermoplastics such as polycarbonate, and ceramic tile. Other organic materials which can be used as substrates in the method of the invention include polystyrene and its mixed polymers, polyolefins, in particular polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile.

The invention is more specifically directed to a method for the production of glasses and especially of lenses, such as ophthalmic lenses, especially eyewear lenses. The substrate preferably is of a transparent material comprising an anti reflective optical layer. However it is also suitable for application to the production of microscope slides, decorative glass pieces, plastic sheets, mirror glass, ceramic or marble tile, glasses for doors and windows, screens (television, computer), mirrors, prisms, watch glasses, lenses of optical devices such as binocular lenses, microscope lenses, telescope lenses, camera lenses, video lenses.

The preferred substrate for lens or ophthalmic glass in the method of the invention may be a treated or untreated synthetic glass formed of, for example, polythiourethane, polymethylmethacrylate (PMMA), polycarbonate, polyacrylate or polydiethylene glycol bisallyl carbonate, or a treated or untreated mineral glass.

Such a substrate usually includes a hard layer and/or a conventional antireflection layer and comprises a multiple layer structure. Such hard layers and anti-reflection layers are usually applied directly to the surface of the untreated ophthalmic glass or on a primer impact resistant layer already formed on the substrate.

In this case, the coating with hydrophobic and oleophobic properties, also known as topcoat, and comprising at least one layer of M1 material, is advantageously not applied directly to the surface of the naked substrate but to the hard layer or the antireflection layer applied to the ophthalmic glass. Such single or multilayer hard layer coatings and antireflection coatings are well known from the persons skilled in the art and it is well known from the prior art to suitably select appropriate materials and layer thicknesses of those materials. As is known from the prior art, antireflection coatings can for example include metal oxides such as silica, titania, alumina, zirconia, tantalum oxide, and combinations thereof. The thickness of the antireflection coating usually is from about 50 nm to about 1,000 nm, preferably from 80 nm to 500 nm.

The method of the invention involves successively exposing the substrate to specific materials in a chamber or closed environment under conditions resulting in the deposit of those materials and possibly the formation of a layer of those materials.

Conditions implying the deposit of materials include reduced pressure, preferably combined with elevated temperature (of materials M1 and M2 during the deposition step).

The heating of the materials M1 and M2 may be implemented by Joule effect, by means of an electron gun, or other means known by the man skilled in the art.

The reduced pressure preferably combined with heating of materials M1 and M2 induce vaporization or sublimation of the materials into the chamber atmosphere and subsequent self assembly and/or self-polymerization on the substrate surface. Advantageously, the deposit is made in a uniform fashion on the substrate.

The preferred deposition process is physical vapour deposition, under vacuum pressure, preferably evaporation under vacuum.

It results in the deposit of a coating on the substrate, wherein said coating results from the deposit of the M1 and M2 materials. It is preferably the final uppermost layer of the optical article.

Comparatively to prior art methods, the method of the invention advantageously permits the anchoring of M1 and M2 molecules on the substrate's surface. By anchoring is meant that a bond is formed between the substrate and the M1 and M2 materials, so that they will not be removed from the lens by a dry wiping of the surface with a cloth or a similar soft treatment, or by a wiping with such cloth with soap, water or alcohol like isopropyl alcohol.

Preferably, the conditions resulting in the deposit of the materials include process parameters which are selected so that M1 and/or M2 molecules are covalently grafted on the substrate's surface. Preferably, at least one of the Si—X1 and Si—X2 groups is covalently bonded with a —OH group of the substrate. Covalent grafting of M1 and/or M2 on the substrate surface encompasses the case wherein M1 and M2 materials are each covalently grafted to the surface of the substrate but also the case wherein there is a covalent bond between M1 and M2 and either M1 or M2, preferably M1, being directly grafted to the surface of the substrate. The method according to the invention comprises exposing one face of the substrate to a material M1 in a vacuum chamber under conditions resulting in the deposit of this material.

By substituted silane is meant a molecule comprising a Si atom comprising at least one function (precited X1 and X2) bonded to the silicon atom capable of forming a covalent bond with a —OH group of a substrate. Preferably, M1 is a substituted silane comprising at least one hydrolysable group or —OH group bonded to the silicon atom.

Suitable hydrolyzable groups are well known from persons skilled in the art. Examples of X1 and X2 hydrolyzable groups bonded to a silicon atom are halogen atoms, such as chlorine, $NH_2$, —NH-alkyl or dialkylamino groups, preferably with $C_1$-$C_{22}$ alkyl groups such as —N(CH$_3$)$_2$ or —N(C$_2$H$_5$)$_2$, alkoxy groups, preferably $C_1$-$C_{22}$ alkoxy groups like —OCH$_3$ or —OC$_2$H$_5$, acyloxy groups, preferably $C_1$-$C_{22}$ acyloxy groups like —OCOCH$_3$ or —OCOC$_2$H$_5$, or isocyanate groups, preferably a —O—N=C(C$_1$-C$_{22}$alkyl)$_2$, like —O—N=C(CH$_3$)$_2$Preferably, the hydrolyzable group is an alkoxy group, particularly a group selected from —OCH$_3$ or —OC$_2$H$_5$According to another favourite variant, it is also possible to use a silane which carries at least one —OH group or at least one —NH$_2$ group.

Advantageously, M1 comprises at least one substituted silyl group —Si(R)$_3$, wherein R represents a hydrolysable group or an —OH group.

Preferably, M1 comprises at least one substituted silyl group —Si(R)$_3$, wherein R represents a group selected from —OCH$_3$, —OC$_2$H$_5$, —OH and —NH$_2$.

Such a substituted silane M1, which is based on a silicon atom with at least one hydrolyzable group (including an amino group) or a hydroxyl group, when used in the method of the invention, produces a durable chemical bond between the silicon atom of the substituted silane M1 and the surface of the lens or ophthalmic glass or the surface of the hard layer or the antireflection layer of the lens or ophthalmic glass through hydroxyl groups on the surface thereof.

Preferably, M1 is a substituted silane comprising one, two, three, four, five or more silicon atoms capable of forming a covalent bond with —OH functions of a substrate and/or M2. Preferably, M1 comprises one, two, three, four, five or more silicon atoms to which hydrolysable groups or —OH groups are bonded. Preferably M1 comprises one or two silicon atoms to which at least one hydrolysable group (such as a NH$_2$ group or a dialkylamino group) or —OH group are bonded.

According to the invention, M1 is a substituted silane comprising at least one fluorine-containing group.

The fluorine containing group results from the assembly of divalent fluoroalkyl groups, fluoroalkenyl groups and/or poly(fluoro alkyl ether) groups. This assembly can also include ether bridges (—O—) and nitrogen containing bridges (—NH—, —N=). When M1 comprises only one substituted silyl group, at least one of the groups of which the assembly is composed is monovalent and at least one of the groups is connected to the silicon atom.

By divalent fluoroalkyl group is meant an alkane di-yl group, linear, branched or cyclic, comprising at least one fluorine atom in replacement of a hydrogen atom. Preferably, the fluoroalkyl group comprises 50% or more of fluorine atoms in replacement of hydrogen atoms, even more preferably 70% or more, and even more preferably 90% or more. According to a favourite variant, the divalent fluoro alkyl group is a perfluorinated alkyl group. For example, the fluorine containing group can comprise unit groups such as —CHF—, —CHF—CHF—, —CH$_2$—C(CF$_3$)$_2$—, —CF$_2$—

$C(CF_3)_2$—, —$CF_2$—, —$CF_2$—$CF_2$—, —$CF_2$—$CF_2$—$CF_2$—, —$CF_2$—$C(CF_3)_2$—, —$(CHF)_n$—, —$(CF_2)_n$—, with n=1, 2, 3, 4, . . .

By divalent fluoroalkenyl group is meant an alkene di-yl group, linear, branched or cyclic, comprising at least one fluorine atom in replacement of a hydrogen atom. Preferably, the fluoroalkenyl group comprises 50% or more of fluorine atoms in replacement of hydrogen atoms, even more preferably 70% or more, and even more preferably 90% or more. According to a favorite variant, the divalent fluoro alkyl group is a perfluorinated alkenyl group.

By poly(fluoro alkyl ether) group is meant a group resulting from the polymerization of alkoxy and fluoroalkoxy units. Preferably, it results from the condensation of fluoroalkoxy units. Examples of such groups can be —(CHF—CHF—O-)n-, —($CH_2$—$CF_2$—O-)n-, —($CF_2$—$CF_2$—O-)n-, —($CF_2$—$CF_2$—$CF_2$—O-)n-, —($CF_2$—CH($CF_3$)—O-)n-, —($CF_2$—$CF(CF_3)$—O-)n-with n=1, 2, 3, 4, . . . and any similar compound. Such groups can also include polyalkoxy units like —($CH_2$—$CH_2$—O-)m-, —($CH_2$—$CH_2$—$CH_2$—O-)m- —($CH_2$—$C(CH_3)_2$—O-)m-units, with m=1, 2, 3, 4 . . . or similar units. According to a favorite variant, the divalent poly(fluoro alkyl ether) group is a poly(perfluorinated alkyl ether) group.

The alkyl and alkenyl groups can be linear, branched or cyclic.

Preferably, the chain length of the fluorine-containing group of M1 is such that the number average molecular weight of M1 is superior or equal to 2000 g/mol, preferably 3000 g/mol. Advantageously, it is superior or equal to 4000 g/mol. Preferably, it is inferior or equal to $1.10^5$ g/mol, more preferably, it is inferior or equal to $1.10^4$ g/mol.

Preferably, the fluorine-containing group of M1 is such that fluorine atoms represent at least 50% by weight of the total molecular weight of M1, even more preferably at least 60% by weight of the total molecular weight of M1.

The manufacturing methods of M1 are such that they are a mixture of molecules with different numbers of substituted silyl groups per molecule and fluorine containing groups of different nature and chain lengths. The evaluation of the chain lengths, the fluorine content, the number average molecular weight, and the number of silyl functions must be understood as being average values.

Advantageously M1 is a mixture of molecules of number average molecular weight comprised between 3000 g/mol and 6000 g/mol, even more advantageously between 4000 g/mol and 5000 g/mol.

The method according to the invention further comprises exposing the face of the substrate resulting from the prior exposition to M1 to a second substituted silane M2 in a chamber under conditions resulting in the deposit of this material.

According to the invention, M2 is a substituted silane, preferably comprising at least one hydrolysable group (such as a $NH_2$ group or a dialkylamino group) or —OH group bonded to the silicon atom.

The substituted silyl groups of which M2 is composed are selected from the same groups as those that can be used to build the M1 material and have been above described.

Preferably, M2 comprises at least one substituted silyl group —Si(R)$_3$, wherein R represents a hydrolysable group or an —OH group.

Preferably, M2 comprises at least one substituted silyl group —Si(R)$_3$, wherein R represents a group selected from —OCH$_3$, —OC$_2$H$_5$, —OH and —NH$_2$.

Advantageously, M2 comprises one and only one substituted silyl group —Si(R)$_3$, wherein R represents a hydrolysable group (such as a $NH_2$ group or a dialkylamino group) or an —OH group.

In addition to the function bonded to the silicon atom capable of forming a covalent bond with a —OH function of the substrate and/or M1, M2 also comprises at least one hydrophilic or hydrophobic and/or oleophobic group.

When the additional group is a hydrophobic or oleophobic group, this group can be defined as resulting from the assembly of divalent or monovalent fluoroalkyl groups, fluoroalkenyl groups, poly(fluoro alkyl ether) groups, poly(perfluoro alkyl ether) groups, alkyl groups, alkenyl groups.

The number average molecular weight of M2 is inferior or equal to 900 g/mol, preferably inferior or equal to 800 g/mol, even more preferably inferior or equal to 700 g/mol and advantageously inferior to 600 g/mol.

The number average molecular weight of M2 is higher or equal to 100 g/mol, preferably higher or equal to 200 g/mol and more preferably higher or equal to 300 g/mol.

Preferred ranges for the molecular weight of M2 are 100 g/mol to 900 g/mol, preferably 100 g/mol to 800 g/mol, more preferably 200 g/mol to 700 g/mol and even better 300 g/mol to 600 g/mol.

Examples of compounds M1 and M2 are known from the literature, as well as their manufacturing methods.

Such compounds have been disclosed in the previous art, for example in U.S. Pat. No. 4,410,563, EP 0203730, EP 749021, EP 844265 and EP 933377, U.S. Pat. No. 6,183,872, WO2006/107083.

Among fluorosilanes that can be preferably used as M1 materials, there may be cited the compounds of the following formula:

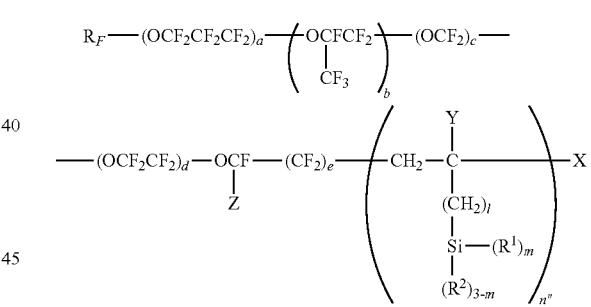

wherein $R_F$ represents a perfluoroalkyl group, Z represents a fluorine atom or a trifluoromethyl group, a, b, c, d and e each independently represent 0 or an integer equal to or higher than 1 provided that a+b+c+d+e is not less than 1, and the order of the repeating units parenthesized by subscripts a, b, c, d and e occurring in the above formula is not limited to that shown; Y represents a hydrogen atom or an alkyl group containing 1 to 4 carbon atoms; X represents a hydrogen, bromine or iodine atom; $R^1$ represents a hydroxyl group, a —$NH_2$ group, or a hydrolyzable substituent group; $R^2$ represents a hydrogen atom or a monovalent hydrocarbon group; I represents 0, 1 or 2; m represents 1, 2 or 3; and n" represents an integer equal to or higher than 1, preferably equal to or higher than 2.

Other preferred compositions for forming the hydrophobic and/or oleophobic surface coating are those containing compounds comprising fluorinated polyether groups, in particular perfluoropolyether groups. A particular preferred class of compositions containing fluorinated polyether groups is disclosed in U.S. Pat. No. 6,277,485. The fluorinated silanes disclosed in this document respond to the following formula:

$$R_F \text{—} [R^1 \text{—} SiY_{3-x}R^2{}_x]_y$$

wherein $R_F$ is a monovalent or divalent polyfluoro polyether group; $R^1$ is a divalent alkylene group, arylene group, or combinations thereof, optionally containing one or more heteroatoms or functional groups and optionally substituted with halide atoms, and preferably containing 2 to 16 carbon atoms; $R^2$ is a lower alkyl group (i.e., a $C_1$-$C_4$ alkyl group); Y is a halide atom, a lower alkoxy group (i.e., a $C_1$-$C_4$ alkoxy group, preferably, a methoxy or ethoxy group), or a lower acyloxy group (i.e., —OC(O)$R^3$ wherein $R^3$ is a $C_1$-$C_4$ alkyl group); x is 0 or 1; and y is 1 ($R_F$ is monovalent) or 2 ($R_F$ is divalent).

Among fluorosilanes, the fluorosilanes having 2 terminal substituted Si groups such as described in EP1300433 are preferably used, especially for the M1 material.

Preferred compounds for M1 typically have a molecular weight (number average) of at least about 1000. Preferably, Y is a lower alkoxy group and $R_F$ is a perfluoro polyether group.

Other preferred compositions for forming the hydrophobic and/or oleophobic surface coating are those containing an organosilicone compound represented by General Formula (A) and/or General Formula (B) and (C):

$$F\text{—}(CF_2)_q\text{—}(OC_3F_6)_m\text{—}(OC_2F_4)_n\text{—}(OCF_2)_o(CH_2)_p \\ X(CH_2)_rSi(X')_{3-a}(R1)_a \quad (A)$$

$$F\text{—}(CF_2)_q\text{—}(OC_3F_6)_m\text{—}(OC_2F_4)_n\text{—}(OCF_2)_o(CH_2)_p \\ X(CH_2)_r\text{—}(X')_{2-a}(R1)_a\text{—}SiO(F\text{—}(CF_2)_q\text{—} \\ (OC_3F_6)_m\text{—}(OC_2F_4)_n\text{—}(OCF_2)_o(CH_2)_pX(CH_2)_r\text{-} \\ (X')_{1-a}(R1)_a SiO)_z F\text{—}(CF_2)_q\text{—}(OC_3F_6)_m\text{—} \\ (OC_2F_4)_n\text{—}(OCF_2)_o(CH_2)_pX(CH_2)_r(X')_{2-a}(R1)_a \\ Si \quad (B)$$

$$F\text{—}(CF_2)_q\text{—}(OC_3F_6)_m\text{—}(OC_2F_4)_n\text{—}(OCF_2)_o\text{—} \\ (CH_2)_p\text{—}X(CH_2)_r\text{—}(CH_2)_t\text{—}Si(X')_{3-a}(R1)_a \quad :(C)$$

wherein q is an integer from 1 to 3; m, n, and o are independently integers from 0 to 200; p is 1 or 2; X is O or a bivalent organic group; r is an integer from 2 to 20; t is an integer from 1 to 10, preferably t=3, R1 is a C1-22 linear or branched hydrocarbon group; a is an integer from 0 to 2; X' is a hydrolysable group as has been above defined or an —OH group; and z is an integer from 0 to 10 when a is 0 or 1.

Such compounds as have been disclosed above by their chemical formulas can be used as the M1 material in the method of the invention.

Such compounds as have been disclosed above by their chemical formulas can be used as the M2 material in the method of the invention, provided that their molecular weight is inferior or equal to 900.

Additionally, the M2 material can be selected among non-fluorinated or fluorinated silanes like those responding to the formula:

$$[H\text{—}(OCH_2\text{—}CH_2)_a\text{—}(OCH_2\text{—}CH_2\text{—}CH_2)_{a'}\text{—} \\ (OCF_2\text{—}CF_2)_{a''}\text{—}(OCF_2\text{—}CF_2\text{—}CF_2)_{a'''}\text{—} \\ (OCHF\text{—}CHF)_{a''''}\text{—}(OCHF\text{—}CHF\text{—}CHF)_{a'''''}]_w \\ X\text{—}(CH_2)_b\text{—}(CF_2)_{b'}\text{—}Si(R)_3 \quad (D)$$

Wherein a, a', a'', a''', a'''', a''''' are integers from 0 to 2, a+a'+a''+a'''+a''''+a''''' is at least one, X is O or N or NH, b and b' are integers from 0 to 10 and b+b' cannot be inferior to 1, R is a hydrolysable group such as has been above defined, or is OH or NH$_2$, the order of the repeating units parenthesized by subscripts a, a', a'', a''', a'''', a''''', b and b' occurring in the above formula is not limited to that shown; w=1 or 2 depending on the valence of X.

Another M2 material which is preferred respond to formula D above wherein X=N; a''=a'''=a''''=a'''''=b'=0 and specifically the hydrophilic compounds responding to formula (D) hereabove wherein a=1 a'=0, X=N and w=2

An example of such a component is $$(HO\text{—}CH_2\text{—}CH_2)_2\text{—}N\text{—}CH_2\text{—}CH_2\text{—}CH_2\text{—}Si \\ (OEt)_3$$

Corresponding to b'=0, known as Gelest 1 obtainable from Gelest company.

The M2 material can be selected among fluorinated silanes like those responding to the formulae:

$$F\text{—}(CF_2)_c\text{—}(CH_2)_d\text{—}(CF_2)_e\text{—}(CH_2)_f\text{—}Si(R)_3 \quad (E)$$

$$H\text{—}(CH_2)_g\text{—}(CF_2)_h\text{—}(CH_2)_i\text{—}(CF_2)_j\text{—}Si(R)_3 \quad (F)$$

wherein each of c, d, e, f, g, h, I, j is an integer from 0 to 10, at least one of c, d, e and f is different from 0, at least one of g, h, i and j is different from 0, and R is a hydrolysable group such as has been above defined, or is OH. Preferably $5 \leq c+d+e+f \leq 15$ and $5 \leq g+h+i+j \leq 15$.

A preferred M2 material is corresponding to the formula (F) wherein c=1, d=0, e=7 f=2 and R is NH$_2$.

Compositions comprising M1 or M2 materials are generally a mixture of compounds resulting from the condensation of distinct fragments, wherein the molecules responding to the above disclosed structures are found to be the most important compounds as compared to the rest of the composition. Preferably compositions comprising the M1 and M2 materials comprise at least 30% (weight/weight of dry matter) of M1, respectively M2, materials, more preferably at least 40%, even more preferably at least 50%, most preferably at least 60% and advantageously at least 70%.

Such compositions can further comprise compounds deprived of the substituted silyl group comprising at least one hydrolysable group or OH group bonded to the silicon atom. Preferably, such compounds are limited in the M1 or M2 compositions to less than 30% (weight/weight of dry matter), even more preferably less than 25%, most preferably less than 20% and advantageously equal or less than 15%.

The M1 layer of the optical article is an anti-fouling topcoat. This anti-fouling surface coating reduces the surface energy of the optical article.

Generally, the hydrophobic and/or oleophobic deposit M1 has a physical thickness lower than 100 nm, preferably lower than 30 nm, preferably ranging from 1 to 20 nm, more preferably ranging from 1 to 10 nm.

According to the invention the hydrophobic and/or oleophobic deposit of materials M1 and M2 has a physical thickness preferably lower than 200 nm, preferably ranging from 1 to 40 nm, more preferably ranging from 1 to 20 nm.

Commercial compositions of M1 materials are the compositions KY130 commercialized by Shin-Etsu Chemical, the composition OPTOOL DSX™ (a fluorine-based resin comprising perfluoropropylene moieties) commercialized by Daikin Industries, the composition AES4 commercialized by Daikin Industries. OPTOOL DSX™ is the most preferred coating composition for the M1 material.

Commercial compositions of M2 materials are the compositions OF110™, a fluoro alkyl silane or OF210™ commercialized by Optron, or Gelest 1 (a bis(2-hydroxyethyl)-3-aminopropyltriethoxysilane commercialized by Gelest.

Generally, the anti-reflection, hydrophobic and/or oil-repellent coatings are applied by evaporation, in vacuum bells, which makes it possible to carry out all the operations successively, with no unduly handling with the glasses between two steps.

Advantageously, the materials M1 and M2 are deposited on the surface of the substrate sequentially, and following the order M1, then M2.

At each step of the method of the invention, the substrate is exposed to the materials of the first and second materials under reduced pressure. (preferably secondary vacuum).

Preferably the elevated temperature vaporization of M1 and M2 is employed.

The temperature of each of the materials of the first and second deposit should be appropriate for their vaporization and deposit on the substrate.

The duration of the exposition is calculated in order to obtain a controlled thickness of the layer. However, the thickness layer values that are given in the experimental part for each of the M1 and M2 layers as indications are calculated values, corresponding to a programmed time of exposure and a speed of deposit, which are higher than the thickness deposited in practice (actual deposited thickness which can be measured on the final coated substrate by classical methods).

The best results of the invention are obtained for thicknesses of M2 material being not higher than the thickness of M1 material.

Preferably, M1 and M2 are deposited under such conditions for forming M1 and M2 layers in a thickness ratio [M2 layer physical thickness]/[M1 layer physical thickness] lower than 1, preferably lower than 0.8.

When the M2 deposit is made directly on a substrate in the absence of a prior application of a deposit of material M1, this M2 layer does not provide a significant improvement of the oleophobic or hydrophobic properties of the substrate Surprisingly, it has been observed that the sequential application of M1 and M2 in the conditions that have been disclosed above provides a significant improvement (reduction) of the surface energy of the substrate as compared to substrates comprising only an M1 deposit.

The inventors have compared the hydrophobic and/or oleophobic properties of those optical articles with those of articles resulting from a prior art method differing only in that the step of deposit of the M2 material is omitted. Surprisingly, they have observed that the articles resulting from the method of the invention have superior hydrophobic and/or oleophobic properties as compared to articles resulting from the prior art method and improved durability of those properties. The substrate bearing a coating obtained by the method of the invention can be compared with the same substrate coated by a layer of M1 material only and of the same thickness. Then it has been observed that hydrophobicity, oleophobicity and durability are improved for the products of the invention as compared to the prior art.

In an embodiment of the invention, the lens on which M1 and M2 have been deposited, once removed from the vacuum machine, is submitted to a mechanical action on its surface such as wiping with a cloth or a tissue.

The wiping can be a dry wiping or a wiping in presence of a liquid solvent, such as an alcohol or water based solvent, preferably with an alcohol.

Isopropyl alcohol is a typical example.

The liquid solvent can be applied at the surface of the lens and then the surface be wiped. And/or the wiping can also be done with the cloth or tissue impregnated with the solvent. The wiping is generally done by a to and fro movement.

The mechanical action can typically be done with a WIPALL™ cloth or a soft Selwyt™ tissue.

The mechanical action is done preferably after several minutes, more preferably after 30 minutes, better after one hour following removal of the lens from the vacuum machine. It is possible to wait for several days before wiping the surface of the lens.

Such mechanical action can enhance hydrophobic properties of the lens, i.e. get lower static contact angle with water.

The method of the invention advantageously results in optical articles coated with an outermost layer having a surface energy lower than or equal to 14 mJ/m$^2$, more preferably lower than or equal to 13 mJ/m$^2$ and even more preferably lower than or equal to 12 mJ/m$^2$ (the surface energies being calculated according to the Owens-Wendt method disclosed in the following reference: "Estimation of the surface force energy of polymers" Owens, D. K.; Wendt R. G. *J. Appl. Polym. Sci.* 1969, 13, 1741-1747).

EXPERIMENTAL

1—Material and Methods:

Lenses:

Orma®1.5 (organic lenses) were used, bearing anti-abrasion and anti-reflection having an upper layer of (SiO$_2$) coatings that are coated in said order on the substrate: Optical articles employed comprise a substrate ORMA® ESSILOR lens having a 65 mm diameter, with a power of −2.00 dioptres and a thickness of 1.2 mm, coated on both faces with an abrasion-resistant and/or an antiscratch coating (hard coat) disclosed in example 3 of the patent EP 0614957 (refractive index 1.50), based on a hydrolysate of GLYMO and DMDES, of colloidal silica and aluminum acetyl acetonate, and with an antireflection coating.

The abrasion-resistant coating was obtained by depositing and curing of a composition comprising by weight, 224 parts of GLYMO, 80.5 parts of HCl 0.1 N, 120 parts of DMDES, 718 parts of a 30 weight % colloidal silica in methanol, 15 parts of aluminum acetyl acetonate and 44 parts of ethylcellosolve. The composition also comprised 0.1% of the surfactant FLUORAD™ FC-430® (3M) by weight as related to the total weight de the composition. This abrasion-resistant coating was deposited directly onto the substrate.

Deposit of the Layers:

The vacuum treating machine used is a BAK 2 machine from Balzers (provided with an electron gun, an ion gun and two evaporation sources with a Joule effect.

The lenses are placed on a carrousel provided with circular openings intended to accommodate the lenses to be treated, the concave side facing the evaporation sources and the ion gun. A vacuum drawing is performed until a secondary vacuum is reached. Then, with the electron gun a successive evaporation of the materials of the antireflective coating is performed.

Following the AR coating composition, M1 and M2 compounds are thermally evaporated by Joule effect.

Layer M1:

A layer of OPTOOL DSX™ commercialized by Daikin Industries is deposited in the following conditions.

A given amount of OPTOOL DSX™ is placed in a copper capsule, in turn placed in a joule effect boat (tantalum boat). A 5 to 20 nm thickness of hydrophobic and oleophobic coating is deposited through evaporation.

Layer M2:

A hydrophilic compound Gelest 1 commercialized by Gelest is deposited in the same conditions.

Alternatively OF110™ can be used as M2 material.

Tests:

Measurement of Advancing Angle and Receding Angle:

Advancing and receding contact angle and hysteresis are measured according to the tilting plate method which captures the contact angles measurements on both the left and right sides of a sessile drop while the solid surface is being inclined typically from 0° to 90° .up to the roll off of the drop.

As the surface is inclined, gravity causes the contact angle on the downhill side to increase while the contact angle on the uphill side decreases.

The last valid readings are captured and normally represent the advancing and receding contact angles.

Respectively, these contact angles are referred to advancing and receding angles. The difference between them is the contact angle hysteresis.

More specifically, the test consists in depositing a 25 microliters drop on a lens positioned on a platform. The platform is then tilted at a constant speed so that the lens is positioned at different angles. After the drop starts moving, the first measurement is taken.

The measurement consists of the advancing angle (the front of the drop), the receding angle (back of the drop), the hysteresis (the difference between front and back) and the angle of the platform.

Examples 1 to 4 and Comparative Examples 1 to 3

Several ophthalmic lenses were treated with a distinct deposition of layers M1 and M2.

The composition and thickness of those layers are given in table 1. In the experimental part, thicknesses must be understood as machine thicknesses used for the process, i.e. programmed thicknesses on the machine taking into account programmed time and exposure and speed of deposit except when the thicknesses are mentioned as actual/real physical thicknesses. (The actual physical thickness of a deposited layer on a substrate (actually measured is in practice lower than the programmed thicknesses.)

TABLE 1

Dual steps evaporations of 1- Optool DSX and 2- Gelest 1

| | M 1 | | | M 2 | | |
|---------|------|----------------|----------------|---------|----------------|----------------|---------------|
| Example | Name | Thickness (nm) | Rate (nm/s) | Name | Thickness (nm) | Rate (nm/s) | Comment |
| 1 | DSX | 10 | 0.4 | Gelest 1 | 6.8 | 0.4 | CX* only |
| 2 | DSX | 10 | 0.4 | Gelest 1 | 8.1 | 0.4 | CX* only |
| 3 | DSX | 15 | 0.4 | Gelest 1 | 8.8 | 0.4 | CX* only |
| 4 | DSX | 19 | 0.4 | Gelest 1 | 5.0 | 0.4 | CX* only |

*CX = convex face

Ina all examples of the invention, the actual physical thickness, (that can be measured on a Woolam Ellipsometer using a Cauchy model) is 7 to 9 nm for a programmed machine thickness of 19 nm, 4 to 5 nm of Optool DSX™ for a programmed thickness of 15 nm, and around 1 to 3 nm for a programmed thickness of 10 nm.

The Dynamic contact angles with water of those samples were measured and are presented in Table 2:

TABLE 2

| | D.I. water Contact angle (°) | | | | |
|---------|--------|-----------|----------|-------------|------------|
| Example | Static | Advancing | Receding | Table Angle | Hysteresis |
| 1 | 117.0 | 119.8 | 114.3 | 18.8 | 5.5 |
| 2 | 117.7 | 118.2 | 112.8 | 27 | 4 |
| 3 | 118.9 | 120 | 112.6 | 18.9 | 6.4 |
| 4 | 117.1 | 118.6 | 111 | 21.1 | 6 |

Very good levels of hydrophobicity are obtained.

It is surprising to obtain such good hydrophobic properties despite the presence of a hydrophilic material.

Other contact angles measurements were implemented with hexadecane to assess the oleophobicity of those surfaces (Table 3):

Comparative example 1 corresponds to a commercial AR coated lens having on top of the AR stack a single layer of around 3 nm actual physical thickness of OPTOOL DSX™. (M1 material)

TABLE 3

| | Hexadecane Contact angle (°) | | |
|-------|-----------|----------|------------|
| Run # | Advancing | Receding | Hysteresis |
| 1 | 70.9 | 64.8 | 6.1 |
| Comparative example 1* | 35.5 | 27.2 | 8.3 |

*comparative

For comparison, dynamic contact angles of D.I. water of the single layer topcoat M1 or M2 applied on the same substrate are reported below:

Comparative Example 2

M1 only=OPTOOL DSX™ is applied (19 nm programmed thickness, i.e. 7 to 9 nm actual physical thickness).
Advancing Contact angle: 121.6°
Receding Contact angle: 107°
Table Angle: 21°
Hysteresis: 14.5°

Comparative Example 3

M2 only=Gelest 1 is applied
The drop doesn't move.

From the results disclosed above, it can be observed that by evaporating a hydrophilic molecule such as Gelest 1, the dynamic contact angle of the surface of the 2-step top coated lenses are similar and even slightly better (hysteresis is smaller, small hysteresis being desired) than the one of a lens top coated by a pure Optool DSX™ material.

As it can be noticed in the hexadecane contact angle test, the sample with the dual-step deposition topcoat has a higher oleophobicity than the reference sample.

Example 5

Example 5 has consisted in evaporating 15 nm of DSX™ (4 to 6 nm of actual thickness) as material M1 followed by evaporation of 5 nm OF110™ (actual physical thickness 2 to 4 nm) as material M2.

A comparative has been done with Optool DSX™ only (programmed thickness 19 nm (7-9 nm actual thickness) (comparative example 2)

The results of dynamic contact angle with water and hysteresis are shown in table 4:

TABLE 4

|  | Example 5 DSX ™ deposition 15 nm followed by deposition of OF110 ™ 5 nm |
| --- | --- |
| Advancing Angle | 121.32° |
| Receding Angle | 112.63° |
| Hysteresis | 8.70° |
| Sliding Angle | 6.33° |

It can be observed that with the 2 step evaporation of M1 followed by M2 we have better performance. The receding angle is higher in the 2 step process as well as the hysteresis and the sliding angle are both lower with the 2 step process.

This result is surprising because the Optool DSX™ is usually recognized by the man skilled in the art as having better hydrophobic properties than the OF110™ material.

Moreover, this is particularly interesting as the Optool DSX™ is an expensive material and the process of the invention allows limiting the amount of Optool DSX™ that needs to be used.

Examples 6 to 10 and Comparative Examples 4 to 8

Two materials are successively deposited under vacuum (M1 first, then M2) (2 steps) or co-evaporated (comparative) on lenses.

They are poured each in a Cu crucible positioned each on a metal boat (use of two boats) and are then thermally and successively evaporated under Joule effect, using electric current, except for comparative examples 7 and 8 wherein the two components M1 and M2 are poured in the same crucible and example 8 wherein the two components are in two different Cu crucible positioned on the same boat.

The invention claimed is:

1. A method for the manufacture of an optical article comprising:
   providing a substrate having two main faces and bearing —OH functions on at least one of its faces; and
   exposing successively at least one face of the substrate bearing —OH functions to at least two distinct materials M1 and M2, M1 having a weight average molecular weight higher than M2, in the order M1 followed by M2, in a vacuum chamber under conditions resulting in the deposit of those materials on the surface of the substrate, wherein:
   M1 is a substituted silane, comprising:
      at least one function X1 bonded to a silicon atom, wherein the Si—X1 group is capable of forming a covalent bond with a —OH group of the substrate, and/or a covalent bond with M2, and
      at least one fluorine containing group,
   M2 is a substituted silane having a number average molecular weight less than or equal to 900 g/mol, comprising:
      at least one function X2 bonded to a silicon atom, wherein the Si—X2 group is capable of forming a covalent bond with a —OH group of the substrate and/or a covalent bond with M1, and
      at least one hydrophobic and/or oleophobic group, or at least one hydrophilic group,
   wherein the difference between the weight average molecular weight of M1 and the weight average molecular weight of M2 is higher than or equal to 600 g/mol, and
   the deposit of M1 and/or M2 is performed by evaporation under reduced pressure; and
   M1 and M2 are covalently grafted on the substrate's surface.

2. The method of claim 1, wherein the difference between the weight average molecular weight of M1 and the weight average molecular weight of M2 is greater than or equal to 900 g/mol.

3. The method of claim 1, wherein the substrate is a transparent material comprising an anti-reflective optical layer.

4. The method of claim 1, wherein X1 and X2 are independently either a hydrolysable group or —OH group.

| Examples | Remarks: on deposition process | First deposited material | Programmed Thickness of first material (nm) | Second deposited material | Thickness of second deposited material | Total thickness (nm) of mixture | Static contact angle with hexadecane |
| --- | --- | --- | --- | --- | --- | --- | --- |
| Comparative example 4 | Only 1 layer | DSX ™ | 19 | — | — |  | 65-66.3° |
| Comparative example 5 | 2 steps | DSX ™ | 19 | KY130 ™ | 10 |  | 67.8° |
| Comparative example 6 | 2 steps | KY130 ™ | 10 | DSX ™ | 9 |  | 67.4° |
| Example 6 | 2 steps | DSX ™ | 19 | OF110 ™ | 10 |  | 81.7° |
| Example 7 | 2 steps** | DSX ™ | 19 | OF110 ™ | 15 |  | 74.1° |
| Example 8 | 2 steps** | DSX ™ | 19 | OF110 ™ | 20 |  | 83.9° |
| Comparative Example 7 | Coevaporation (simultaneous evaporation of M1 and M2)*** (mixture DSX ™ + OF110 ™ in the same crucible) | DSX ™ |  | OF110 ™ |  | 20 nm | 69° |
| Comparative example 8 | Coevaporation (simultaneous evaporation M1 and M2 being each in different Cu crucibles positioned on the same boat) | DSX ™ |  | OF110 ™ |  | 20 nm | 68.4° |

Remarks: 19 nm DSX ™ programmed thickness: 7 to 9 nm actual physical thickness 10 nm OF110 ™ programmed thickness: 5 to 7 nm actual physical thickness.
**deposition using two different boats (one for each component M1 and M2), Lenses obtained by the two step deposition of the invention are clearly more oleophobic than the lenses of the comparative examples.

5. The method of claim 4, wherein X1 and X2 are independently chosen from a halogen atom, a —NH-alkyl group, a dialkylamino group, an alkoxy group, an acyloxy group, an isocyanate group, a —OH group and a —NH$_2$ group.

6. The method of claim 1, wherein the fluorine containing group results from the assembly of at least one of a divalent fluoroalkyl group, a fluoroalkenyl group, and a poly(fluoro alkyl ether) group.

7. The method of claim 1, wherein the average molecular weight of M1 is greater than or equal to 2000 g/mol.

8. The method of claim 7, wherein the average molecular weight of M1 ranges from 3000 to 6000 g/mol.

9. The method of claim 1, wherein M1 and M2 are independently a compound of the following formulae:

$$R_F—(OCF_2CF_2CF_2)_a\left(\begin{array}{c}OCFCF_2\\|\\CF_3\end{array}\right)_b—(OCF_2)_c—$$

$$—(OCF_2CF_2)_d—OCF—(CF_2)_e\left(\begin{array}{c}Y\\|\\CH_2—C—\\|\\(CH_2)_l\\|\\Si—(R^1)_m\\|\\(R^2)_{3-m}\end{array}\right)_{n''}—X$$

wherein:
R$_F$ is a perfluoroalkyl group;
Z is a fluorine atom or a trifluoromethyl group;
a, b, c, d and e each independently are 0 or an integer equal to or higher than 1 provided that a+b+c+d+e is not less than 1, and order of the repeating units parenthesized by subscripts a, b, c, d and e occurring in the above formula is not limited to that shown;
Y is a hydrogen atom or an alkyl group containing 1 to 4 carbon atoms;
X is a hydrogen, bromine, or iodine atom;
R$^1$ is a hydroxyl group, a NH$_2$ group or a hydrolyzable substituent group;
R$^2$ is a hydrogen atom or a monovalent hydrocarbon group;
l is 0, 1 or 2;
m represents 1, 2 or 3; and
n'' is an integer equal to or higher than 1; or
a compounds of General Formula (A) or General Formula (B) and (C):

$$F—(CF_2)_q—(OC_3F_6)_m—(OC_2F_4)_n—(OCF_2)_o—(CH_2)_p—X(CH_2)_r—Si(X')_{3-a}(R1)_a \quad (A)$$

$$F—(CF_2)_q—(OC_3F_6)_m—(OC_2F_4)_n—(OCF_2)_o(CH_2)_pX(CH_2)_r(X')_{2-a}(R1)_aSiO(F—(CF_2)_q—(OC_3F_6)_m—(OC_2F_4)_n—(OCF_2)_o(CH_2)_pX(CH_2)_r(X')_{1-a}(R1)_aSiO)_tF—(CF_2)_q—(OC_3F_6)_m—(OC_2F_4)_n—(OCF_2)_o(CH_2)_pX(CH_2)_r(X')_{2-a}(R1)_aSi \quad (B)$$

$$F—(CF_2)_q—(OC_3F_6)_m—(OC_2F_4)_n—(OCF_2)_o—(CH_2)_p—X(CH_2)_r—(CH_2)_t—Si(X')_{3-a}(R1)_a \quad (C)$$

wherein:
q is an integer from 1 to 3;
m, n, and o are independently integers from 0 to 200;
p is 1 or 2;
X is O or a bivalent organic group;
r is an integer from 2 to 20;
t is an integer from 1 to 10;
R1 is a C1-22 linear or branched hydrocarbon group;
a is an integer from 0 to 2;
X' is a hydrolysable group, an —OH group or a —NH$_2$ group; and
z is an integer from 0 to 10 when a is 0 or 1.

10. The method of claim 1, wherein M2 is a non-fluorinated or fluorinated silane responding to formulae D, E or F:

$$[H—(OCH_2—CH_2)_a—(OCH_2—CH_2—CH_2)_{a'}—(OCF_2—CF_2)_{a''}—(OCF_2—CF_2—CF_2)_{a'''}—(OCHF—CHF)_{a''''}—(OCHF—CHF—CHF)_{a'''''}]_w$$
$$X—(CH_2)_b—(CF_2)_{b'}—Si(R)_3 \quad (D)$$

wherein:
a, a', a'', a''', a'''', a''''' are integers from 0 to 2;
a+a'+a''+a'''+a''''+a''''' is at least one;
X is O or N or NH;
b and b' are integers from 0 to 10 and b+b' cannot be less than 1;
R is a hydrolysable group such as defined above or is OH or NH$_2$;
order of the repeating units parenthesized by subscripts a, a', a'', a''', a'''', a''''', b and b' occurring in the above formula is not limited to that shown; and
w=1 or 2 depending on the valence of X;

$$F—(CF_2)_c—(CH_2)_d—(CF_2)_e—(CH_2)_f—Si(R)_3 \quad (E);$$

$$H—(CH_2)_g—(CF_2)_h—(CH_2)_i—(CF_2)_j—Si(R)_3 \quad (F);$$

wherein:
each of c, d, e, f, g, h, i, j is an integer from 0 to 10;
at least one of c, d, e and f is not 0;
at least one of g, h, i and j is not 0; and
R is a hydrolysable group as defined above, OH, or NH$_2$.

11. The method of claim 1, wherein the number average molecular weight of M2 is less than or equal to 800 g/mol.

12. The method of claim 1, wherein M1 is deposited prior to M2, and M1 and M2 are deposited under such conditions for forming M1 and M2 layers in a thickness ratio [M2 layer actual physical thickness] / [M1 layer actual physical thickness] lower than 1.

13. The method of claim 12, wherein the thickness ratio [M2 layer actual physical thickness] / [M1 layer actual physical thickness] is lower than 0.8.

14. The method of claim 1, wherein the M1 deposit has an actual physical thickness lower than 50 nm.

15. The method of claim 14, wherein the M1 deposit has an actual physical thickness lower than 40 nm.

16. The method of claim 15, wherein the M1 deposit has an actual physical thickness lower than 10 nm.

17. The method of claim 1, wherein the M1+M2 deposit has an actual physical thickness lower than 200 nm.

18. An optical article obtained by the method of claim 1.

19. The optical article of claim 18, further defined as having a surface energy lower than or equal to 14 mJ/m$^2$.

20. The optical article of claim 18, further defined as having a surface with a static contact angle with hexadecane higher than 70°.

21. The method of claim 1, wherein M2 also comprises at least one hydrophilic group in addition to the function bonded to the silicon atom capable of forming a covalent bond.

22. The method of claim 21, wherein M2 is a non-fluorinated or fluorinated silane responding to formula:

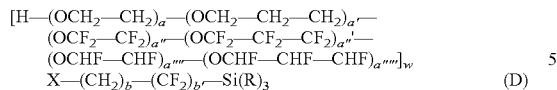 (D)

wherein:

a, a', a'', a''', a'''', a''''' are integers from 0 to 2;

a+a'+a''+a'''+a'''' is at least one;

X is O or N or NH;

b and b' are integers from 0 to 10 and b+b' cannot be less than 1;

R is a hydrolysable group such as defined above or is OH or NH$_2$;

order of the repeating units parenthesized by subscripts a, a', a'', a''', a'''', a''''', b and b' occurring in the above formula is not limited to that shown; and w=1 or 2 depending on the valence of X.

23. The method of claim 22, wherein M2 is (HOCH2CH2)2NCH2CH2Si(OEt)3.

* * * * *

UNITED STATES PATENT AND TRADEMARK OFFICE
CERTIFICATE OF CORRECTION

PATENT NO. : 9,726,787 B2  
APPLICATION NO. : 14/758124  
DATED : August 8, 2017  
INVENTOR(S) : Gerald Fournand, Agnes Jallouli and Dominique Conte Page 1 of 1

It is certified that error appears in the above-identified patent and that said Letters Patent is hereby corrected as shown below:

In the Claims

Claim 22, Column 19, Line 9:
Delete "a+a'+a"+a'"+a'"+a""" and replace with -- a+a'+a"+a'" +a""+a""" --.

Signed and Sealed this  
Twenty-first Day of November, 2017

Joseph Matal  
*Performing the Functions and Duties of the*  
*Under Secretary of Commerce for Intellectual Property and*  
*Director of the United States Patent and Trademark Office*